US008964368B2

(12) United States Patent
Looney et al.

(10) Patent No.: US 8,964,368 B2
(45) Date of Patent: Feb. 24, 2015

(54) SYSTEMS AND METHODS FOR MOUNTING OF PLUG-IN ELECTRONICS DONGLES

(75) Inventors: David Looney, Glendale, AZ (US); Joseph Nutaro, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 290 days.

(21) Appl. No.: 13/471,738

(22) Filed: May 15, 2012

(65) Prior Publication Data

US 2013/0309920 A1    Nov. 21, 2013

(51) Int. Cl.
*H05K 5/00* (2006.01)

(52) U.S. Cl.
USPC .................. 361/679.3; 361/679.31; 174/66; 174/67

(58) Field of Classification Search
USPC ........... 174/66, 67, 679.3, 679.31; 361/679.3, 361/679.31
See application file for complete search history.

(56) References Cited

U.S. PATENT DOCUMENTS

| | | | |
|---|---|---|---|
| 6,637,166 B2 * | 10/2003 | Kinsey | ................ 52/220.8 |
| 7,609,512 B2 | 10/2009 | Richardson et al. | |
| 2004/0094318 A1 * | 5/2004 | Koessler | ................ 174/50 |
| 2012/0000689 A1 | 1/2012 | Shu et al. | |
| 2012/0206874 A1 * | 8/2012 | Huang | ............ 361/679.31 |

OTHER PUBLICATIONS

European Patent Office, "European Search Report", "from Foreign Counterpart of U.S. Appl. No. 13/471,738", Sep. 23, 2013, pp. 1-3, Published in: EP.

European Patent Office, "Office Action", "from Foreign Counterpart of U.S. Appl. No. 13/471,738", Nov. 15, 2013, pp. 1-4, Published in: EP.
"Dongle Lockbox", "accessed May 2, 2012", , pp. 1-2, Publisher: http://www.donglelockbox.com/Product_Info.
"DongleLockbox.com Schematic", "accessed May 2, 2012", , p. 1 Publisher: DongleLockbox.com.
"Operating Instructions DongleLockbox Model DLB-USB2", "accessed May 2, 2012", , pp. 1-2, Publisher: DongleLockbox.com.
"Garmin 795 / 796 Bare Wires Mount", "accessed May 2, 2012", , pp. 1-2, Publisher: http://www.mypilotstore.com/MyPilotStore/sep/8410.
"Helm X650 Panel Mount Aviation GPS Accessory", "accessed May 2, 2012", , pp. 1-2, Publisher: http://www.helmnav.com/HelmX650Accessories.htm.
"Dongle Security Box", "accessed May 2, 2012", , p. 1 Publisher: http://signweb.com/content/dongle-security-box.
"Dongle Security Box", "accessed May 2, 2012", Feb. 16, 2011, p. 1 Publisher: http://signweb.com/content/dongle-security-box.

(Continued)

*Primary Examiner* — Jenny L Wagner
*Assistant Examiner* — Michael E Moats, Jr.
(74) *Attorney, Agent, or Firm* — Fogg & Powers LLC (57) ABSTRACT

Systems and methods for mounting of plug-in electronic dongles are provided. In one embodiment, an electronics mounting adapter device comprises: a base member that includes a cavity and at least one cable stabilizing element configured to secure a cable connector of a cable within the cavity, wherein the cable is routed though an opening in the base member into the cavity; a cover coupled to the base member by at least one fastener; one or more mounting provisions for securing the base member to a mounting surface; and at least one clamping element configured to clamp a dongle within the cavity, wherein the dongle is coupled to the cable connector.

19 Claims, 10 Drawing Sheets

(56) References Cited

OTHER PUBLICATIONS

PLYDON, "USB Bracket Assembly for SonicWALL TZ 210 / NSA 240", Sep. 7, 2009, p. 2.

"Universal USB Dongle Clip, Suction Cup and Extension cable for Window mounting or Laptop Mount dock Fits All Brand USB ", "accessed May 2, 2012", , pp. 1-5, Publisher: http://www.amazon.com/Universal-Suction-Extension-mounting-DONGLE.

* cited by examiner

SYSTEMS AND METHODS FOR MOUNTING OF PLUG-IN ELECTRONICS DONGLES

BACKGROUND

Consumer grade wireless communication devices present a cost effective alternative for providing wireless communication functions onboard aircraft as compared to equipment specifically designed for avionics application. For example, a wireless "aircard", or "dongle" with a combined radio transceiver(s) and antenna(s) can be easily connected to avionics equipment in an aircraft's equipment bay via a cable to provide that avionics equipment with a new wireless communication link. Data can be transferred inexpensively over consumer communication networks rather than using traditional avionics communications. In many cases, the commercial dongles have the advantage of being certified by the communication certification authorities and communications networks for the locations where they are sold thus reducing the complexity and expense of having to certify custom avionics radios and antennas in each country the aircraft operates.

One problem that arises for using a standard plug-in dongle on an aircraft, is that it needs to be semi-permanently mounted within a fight deck or cabin and connected to avionics equipment in the aircraft's equipment bay via a cable. However, mounting such a device in a cabin is not as simple as it seems. Aircraft vibrations can dislodge a plug-in dongle from its cable. Additionally, it is not only desirable to provide a secure mount, but its mounting should also be visually attractive so as not to disturb the aesthetics of high end business jet interiors. Further, in order to meet aircraft certification standards, the device should be easily replaceable without special tools.

For the reasons stated above and for other reasons stated below which will become apparent to those skilled in the art upon reading and understanding the specification, there is a need in the art for improved systems and methods for mounting of plug-in electronics dongles.

SUMMARY

The Embodiments of the present invention provide methods and systems for improved systems and methods for mounting of plug-in electronics dongles and will be understood by reading and studying the following specification.

Systems and methods for mounting of plug-in electronic dongles are provided. In one embodiment, an electronics mounting adapter device comprises: a base member that includes a cavity and at least one cable stabilizing element configured to secure a cable connector of a cable within the cavity, wherein the cable is routed though an opening in the base member into the cavity; a cover coupled to the base member by at least one fastener; one or more mounting provisions for securing the base member to a mounting surface; and at least one clamping element configured to clamp a dongle within the cavity, wherein the dongle is coupled to the cable connector.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

As describe below in detail, the present disclosure described various embodiments for electronics mounting adapters suitable for preventing vibration effects that can loosen the electrical connection between a dongle and a cable connector while providing an aesthetically pleasing housing that prevents the dongle from directly being viewable. These adapters can accommodate a range of different sizes and shapes of dongles and provide a clamping mechanism to hold the dongle and its cable firmly aligned while preventing vibration or disconnections. In the embodiments described below, no special tools are required for installing or removing a dongle. Holes may be provided to properly vent a heat produced by the dongle as well as means for using an external antenna. In some embodiments, to reduce the need to change dongles when travelling between to various locations, a dual adapter configuration is available to hold two different dongle types simultaneously. Alternately one or more companion adapters can be linked to a first adapted as described herein.

FIG. 1 is a diagram illustrating an electronics mounting adapter 100 of one embodiment of the present invention. Electronics mounting adapted 100 comprises a base member 110 with a cover 120 that is detachably coupled to the base member 110. Base member 110 comprises a cavity 112 for receiving and securing a dongle 130 which is electronically coupled to a cable 136 by a cable connector 135. As the term is used in this application, a "dongle" is a self-contained plug-in style peripheral device which enhances the computer system it is connected with one or more functions such as communications with a telecommunications network or local wireless network along with memory storage and security functions. Dongles typically contain such elements as radios and antennas and memory along with a processing element. In the particular embodiment shown in FIG. 1, dongle 130 is a self-contained wireless communications transceiver for radio communications, such as a WiFi modem (i.e. IEEE 802.11(a),(b),(g) or (n), for example), or a wireless telecommunications radio (such as for WiMAX or LTE, for example). These wireless protocols are mentioned as examples only for in other embodiments, dongle 130 may perform wireless communications using other protocols and any form of modulation. Further, for any of the embodiments described herein, a dongle may include a wireless transceiver used to establish other forms of wireless communications such as, but not limited to, infrared, ultraviolet, magnetic, inductive, and audio.

Figure 1A:
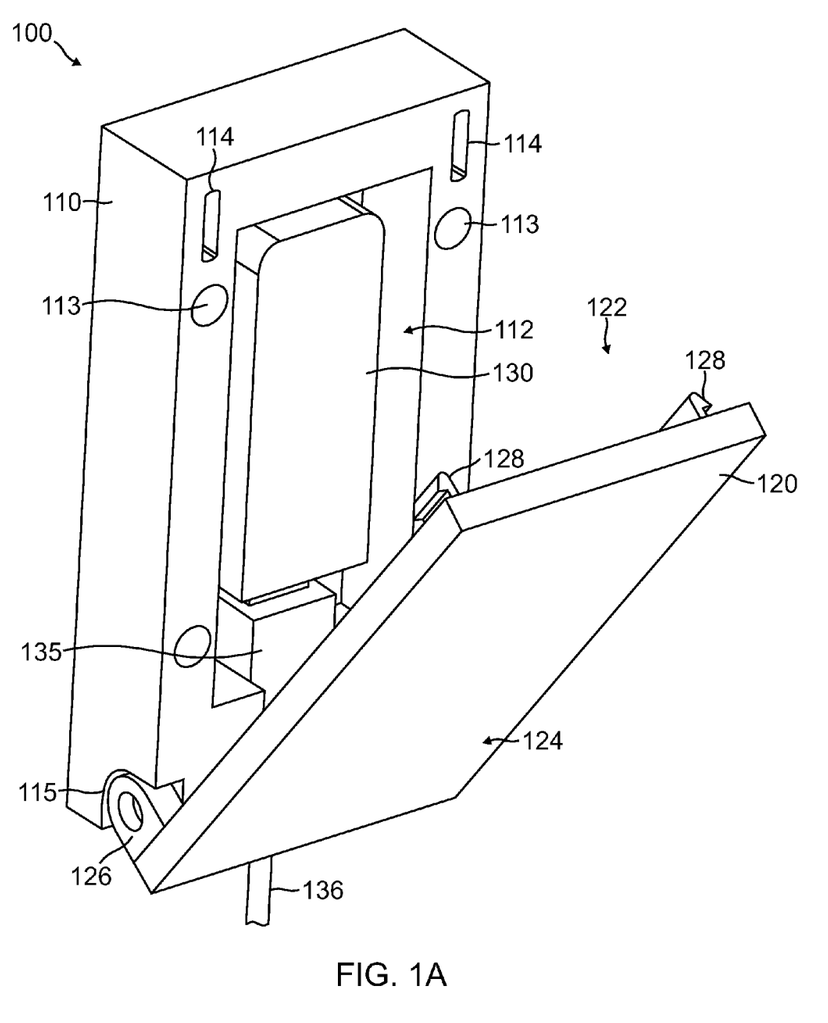
FIGS. 1A to 1E are diagrams illustrating electronics mounting adapters of embodiments of the present invention.

Base member 110 further includes one or more mounting provisions 113 for securing electronics mounting adapter 100 to a mounting surface, such wall as within a cabin or flight deck of an aircraft. In the particular embodiment shown in FIG. 1, the mounting provisions 113 comprise mounting through holes shaped to receives fasteners 117 (such as threaded screws or bolts, for example), that hold base member 110 to the mounting surface.

Figure 1B:
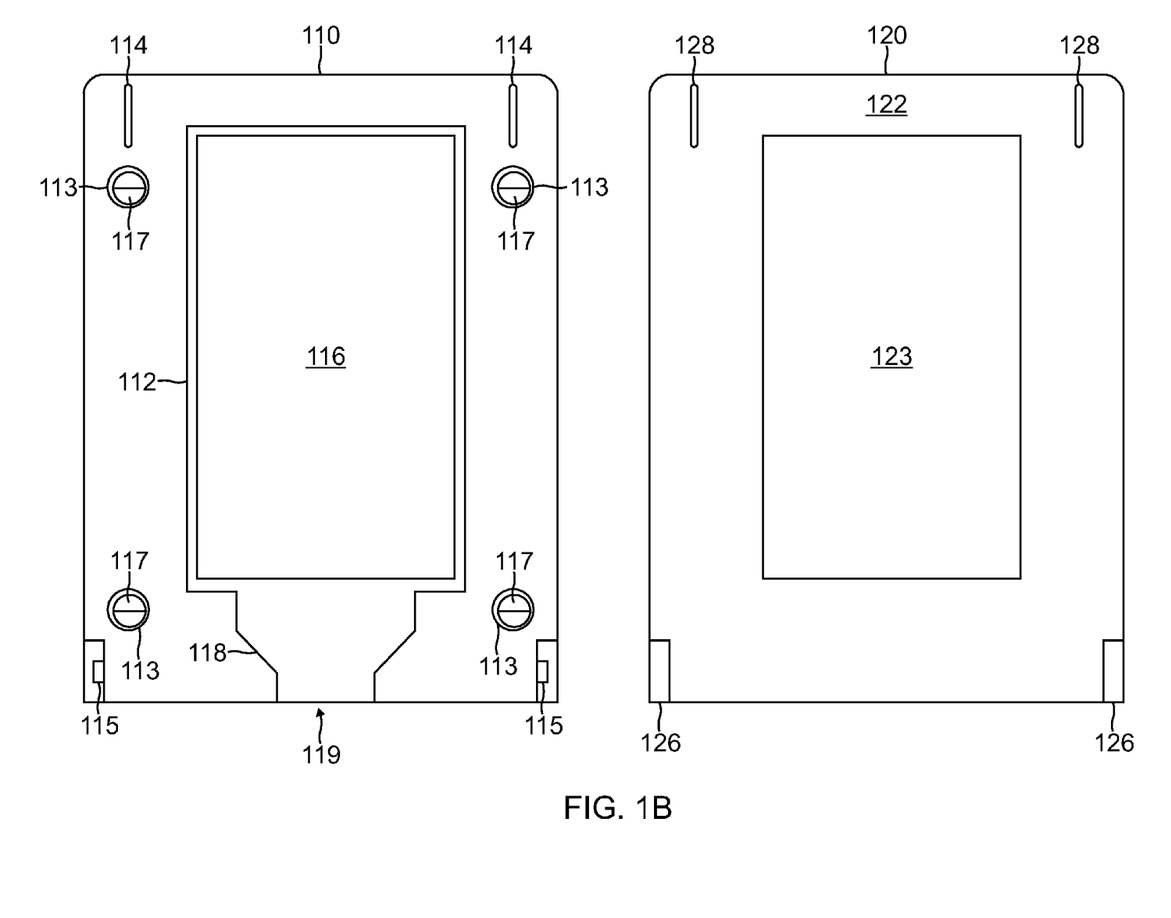
Figure 1C:
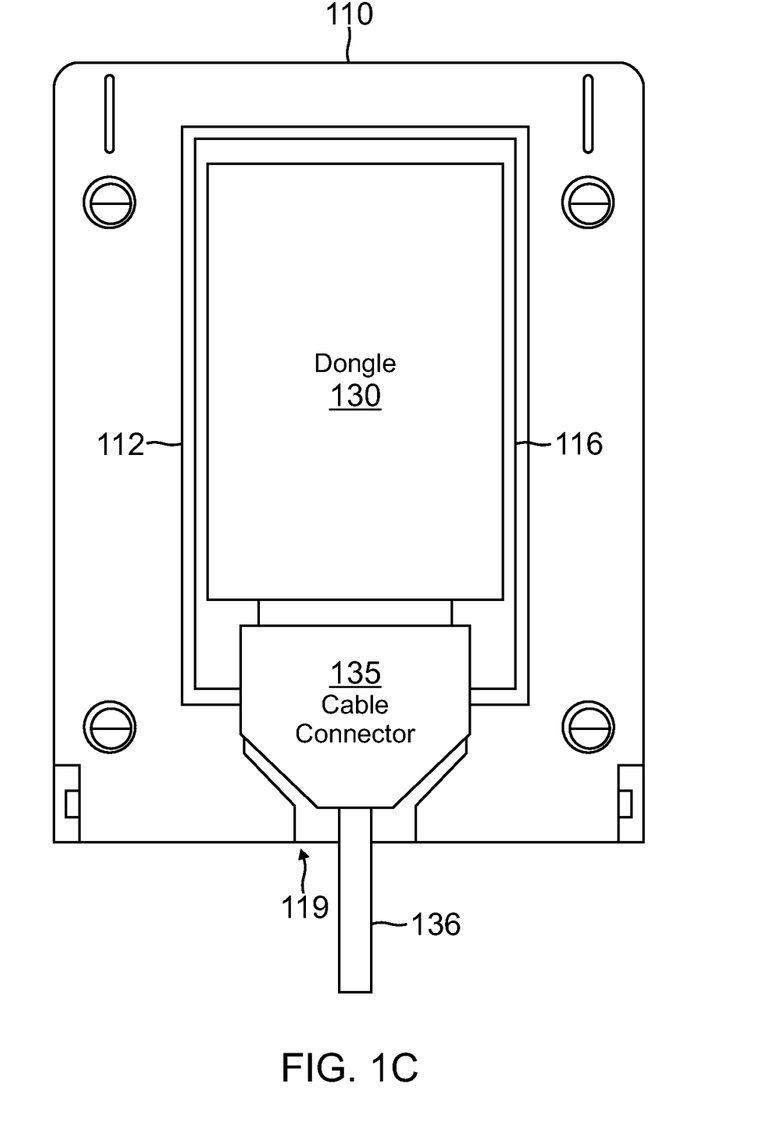
Figure 1D:
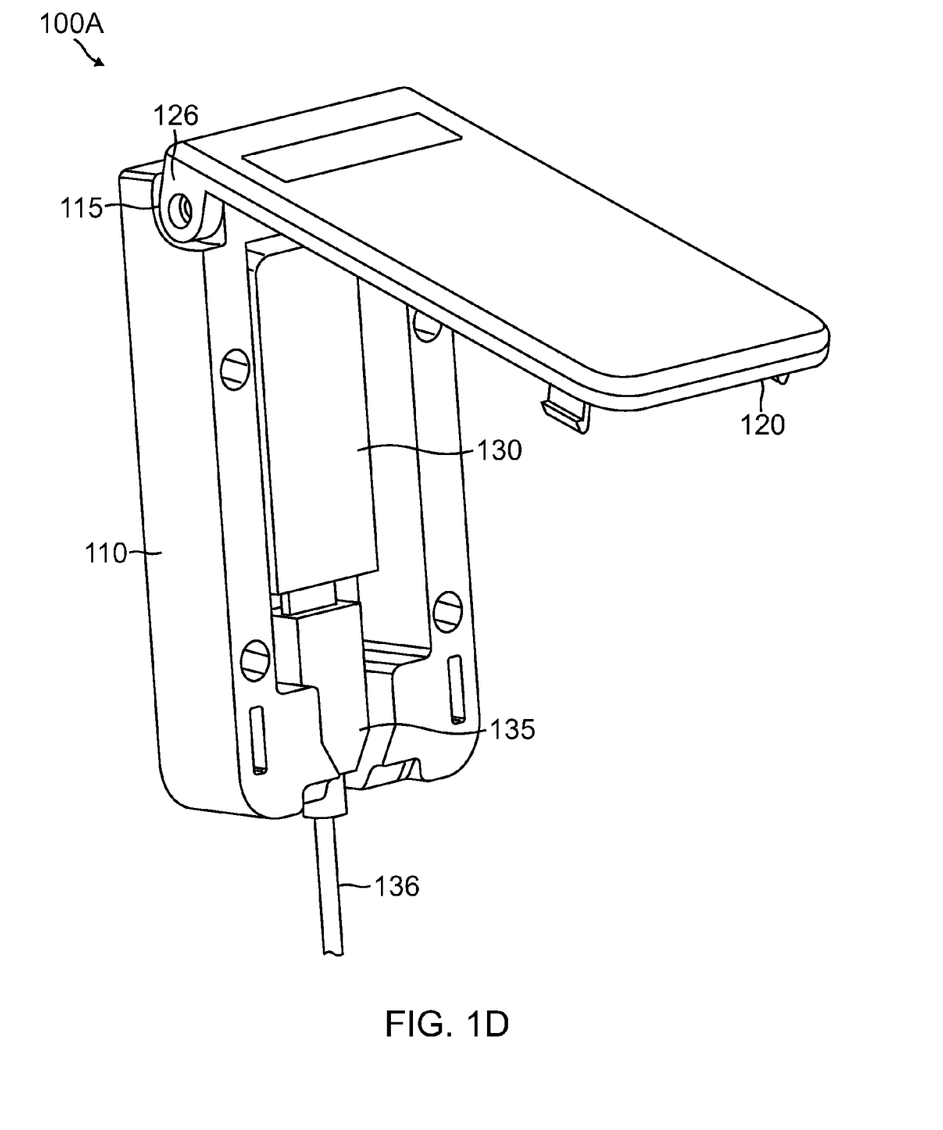

Cover 120 includes an interior surface 122 that faces cavity 112 when cover 120 is closed, and an exterior surface 124. As shown in FIG. 1B, cover 120 includes hinge fasteners 126 that engage hinge fasteners 115 on base member 110 so that cover 120 can securely rotate with respect to base member 110 between an open and closed position. In the embodiment shown in FIG. 1B, a set of snap fasteners 128 are located on the interior surface 122 that engage snap fastener receivers 114 on base member 110 to hold cover 120 closed tight against base member 110. In one embodiment, the exterior surface 124 of cover 120 is configured to have an aesthetically pleasing appearance, such as by comprising a wood grain veneer, or by accommodating replaceable decorative panels. In one embodiment, cover 120 is sized or includes an extension that shrouds or hides at least part of cable 136 and a cable pass-through into the aircraft partition upon which the base 110 is mounted. FIG. 1D shows one alternate configuration of electronics mounting adapter 100 where hinge elements 126/115 are located on the side of electronics mounting adapter 100 opposing cable 136. In some embodiments, either one or both of base member 110 and cover 120 include penetrations for venting heat produced within cavity 112, or for providing access for attaching an external antenna to dongle 130.

The interior region of cavity 112 is sized and shaped to accommodate a range of commercially available dongles. Because electronics mounting adapter 100 is primarily designed for avionics use (although not strictly limited to avionics use), it is designed to prevent vibrations from loosening the electrical connection between dongle 130 and cable connector 135.

To mitigate the effect of such vibrations, electronics mounting adapter 100 first includes at least one cable stabilizing element 118. In the particular embodiment shown in FIG. 1, cable stabilizing element 118 comprises a friction fit clamp formed from a wedge shaped featured defined by the walls of cavity 112 in the proximity of an opening 119 where cable 136 enters base member 110. For example, in one embodiment, cable 136 is a Universal Serial Bus (USB) cable and cable connector 135 is a standard sized Type-A USB connector. In such an embodiment, cable stabilizing element 118 is sized in width to snugly accommodate the cable connector 135 for the Type-A USB connector. That is, cable connector 135 is held in place by a friction fit with the walls of cavity 112. Further, the wedge shape of cable stabilizing element 118 narrows around cable 136 so that cable 136 fits through opening 119 but cable connector 135 will not. In other embodiments, cable 136 may be any other form of cable including Ethernet, ARINC 429, or a fiber optic cable. For such cases, cable stabilizing element 118 is sized to properly accommodate the cable's connector by a friction fit with the walls of cavity 112 as described above.

Electronics mounting adapter 100 also includes at least one element for clamping the motion of dongle 130 within cavity 112. For example, in the embodiment of FIG. 1B, one or both of cavity 112 and cover 120, include a strip of conforming material (such a malleable foam, for example) such as shown at 116 and 123 respectively. The conforming material 116, 123 functions to hold dongle 130 firmly in place and aligned with cable connector 135 despite vibration. This embodiment has the distinct advantage of not requiring any special tools or custom sized frame. Further, in one embodiment the conforming material 116, 123 is removable so that it may easily be replaced. This is advantageous where the conforming material 116, 123 becomes aged and loose elasticity over time, or where different sizes and/or shapes are used to better accommodate the particular dongle 130 installed. For example, in one embodiment, conforming material 116, 123 are secured to the respective surfaces of base 110 and/or cover 120 by pressure sensitive adhesive (PSA) or hook and loop fastener material (such as Velcro, for example). In operation, when cover 120 is closed and snapped shut, the closed cover 120 applies a force onto dongle 130 causing the conforming material 116, 123 to deform around dongle 130 to secure it in place and prevent the dongle 130 from moving and causing the connector 135 to unplug.

Figure 1E:
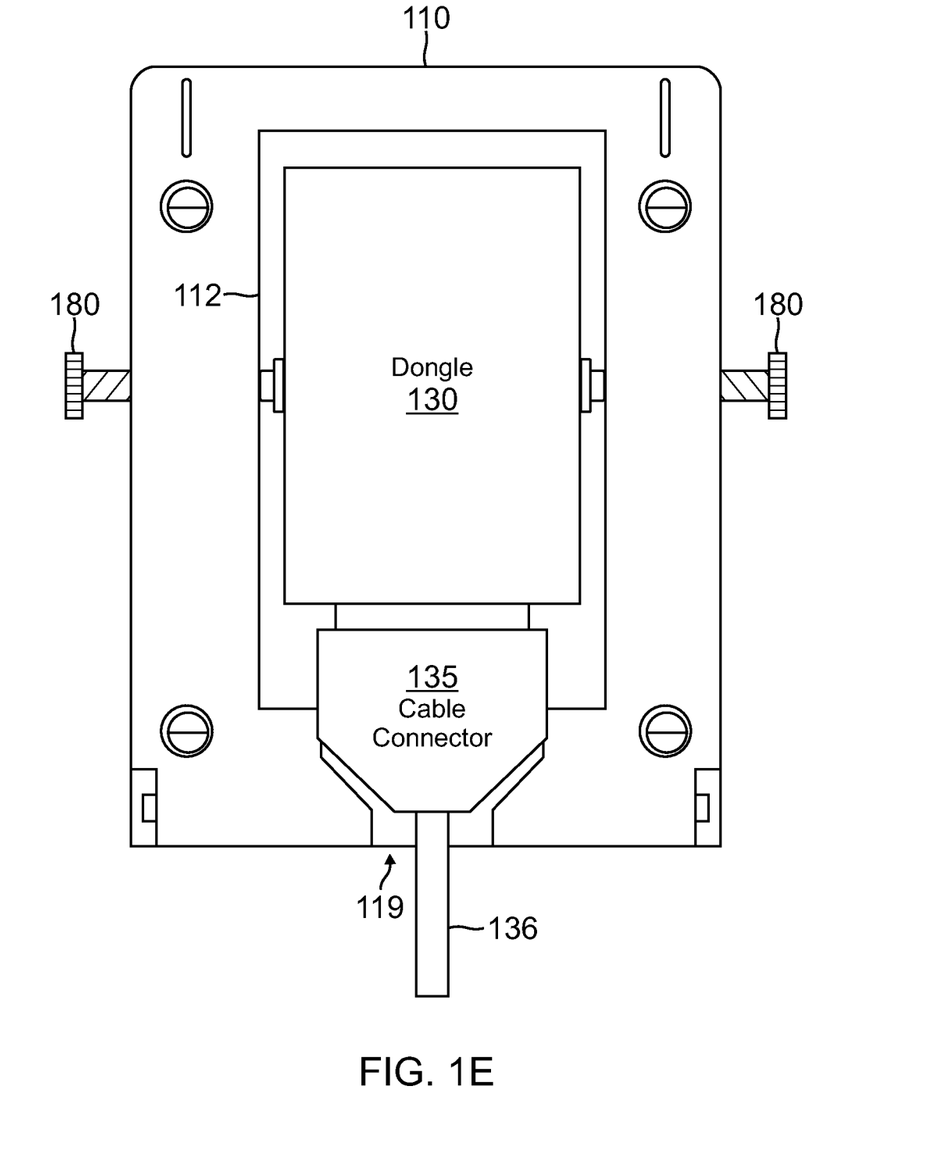

In still other embodiments, other means may be used for clamping the motion of dongle 130 within cavity 112. For example, in one embodiment, as shown in FIG. 1E, base member 110 includes one or more hand operated fasteners 180 (such as a threaded or spring operated fastener, for example) that penetrate base member 110 into cavity 112. In operation, the hand operated fasteners may be tightened to apply a clamping force on dongle 130 that inhibits its motions within cavity 112 and keeps it properly aligned for coupling with cable connector 135. As would be appreciated by one of ordinary skill in the art upon reading this specification, the means for clamping the motion of dongle 130 present in this disclosure allow electronics mounting adapter 100 to securely accommodate dongles of various sizes and shapes.

Figure 2:
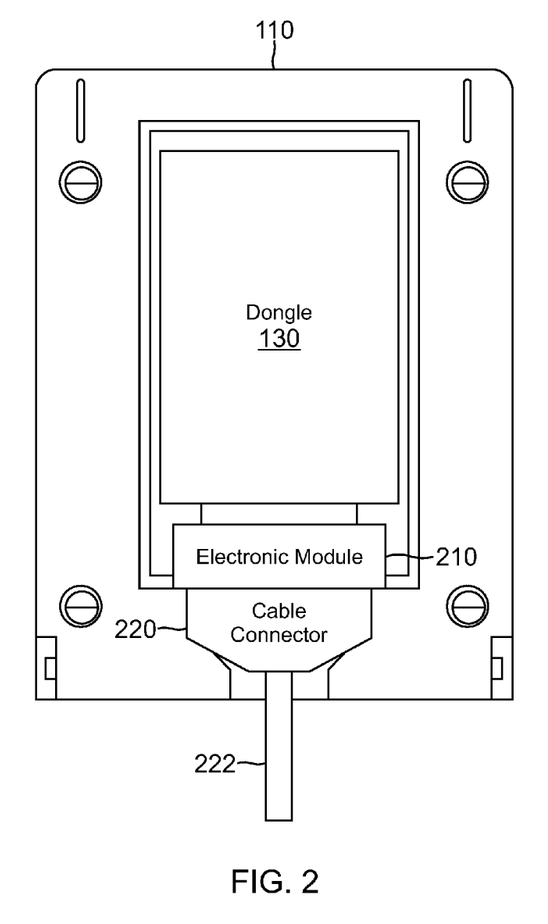
FIG. 2 is a diagram illustrating an electronics mounting adapter of an embodiment of the present invention.

FIG. 2 is a diagram illustrating an alternate implementation where base member 110 further incorporates an electronics module 210 that couples dongle 130 to a cable connector 220. In one or more embodiments, electronics module 210 optionally functions as a signal conditioner and/or amplifier to facilitate the use of long cable runs. For example, in one embodiment cable 222 is a USB 2.0 cable, which is normally limited to a length of 5 meters. Electronics module 210 may provide for amplification of transmitted and/or received signals so that a longer length may be used for cable 222. In one or more other embodiments, electronics module 210 optionally functions as a connector converter facilitate electrical connections between dongle 130 and cable connector 220 where different mechanical plug interfaces are used. For example, in one embodiment may converts between a Standard-A type of USB plug of cable connector 220 to a USB Mini-B type of plug used by dongle 130. This example is not meant to be limiting as electronics module 210 providing for conversion between other combinations of connector plugs are also possible. In still one or more other embodiments, electronics module 210 providing for conversion between different network cable protocols. For example, in one embodiment cable 222 comprises an Ethernet protocol cable while dongle 130 comprises a USB connector. Each of the two components connects to electronics module 210, which provides the electronics necessary to convert data between the two protocols and facilitate communication of data between dongle 130 and cable connector 220. In still other embodiments, electronic module 210 may perform any combination of these functions.

Figure 3:
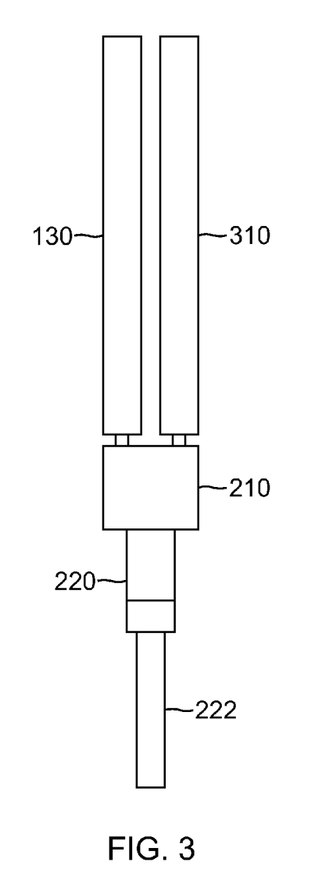
FIG. 3 is a diagram illustrating an electronics module for coupling two dongles to a single cable of one embodiment of the present invention.

FIG. 3 is a diagram illustrating yet another alternate implementation where electronics module 210 facilitates coupling a plurality of dongles to cable connector 220. That is, in addition to any of the functions described above, electronics module 210 can further function as a distribution hub. For example, in the particular embodiment shown in FIG. 3, electronics module 210 functions as a 2×1 hub permitting two dongles (dongle 130 and dongle 310) to communicate via the single cable 222 which provides each of the dongles with power and communications. Such an embodiment is useful where it is desired to operate two different dongle types. For example, one dongle (dongle 130, for example) may be configured to be compatible with one or more U.S. cellular carrier standards while a second dongle (dongle 310, for example) is configured to be compatible with cellular carrier standards used in China. For example, the appropriate dongle will be powered on or off to enable communication based upon the location of the aircraft. This eliminates the need to replace a dongle when an aircraft flies from an area of one cellular standard to another. Similarly, the different dongles might facilitate different communications needs, such as where one dongle (dongle 130, for example) may be configured to be compatible with cellular carrier standards while the second dongle (dongle 310, for example) is for shorter range WLAN (e.g. 802.11(a)(b)(g)(n)) data communications either within the aircraft or with other nearby equipment while on the ground at an airport, for example.

Figure 4:
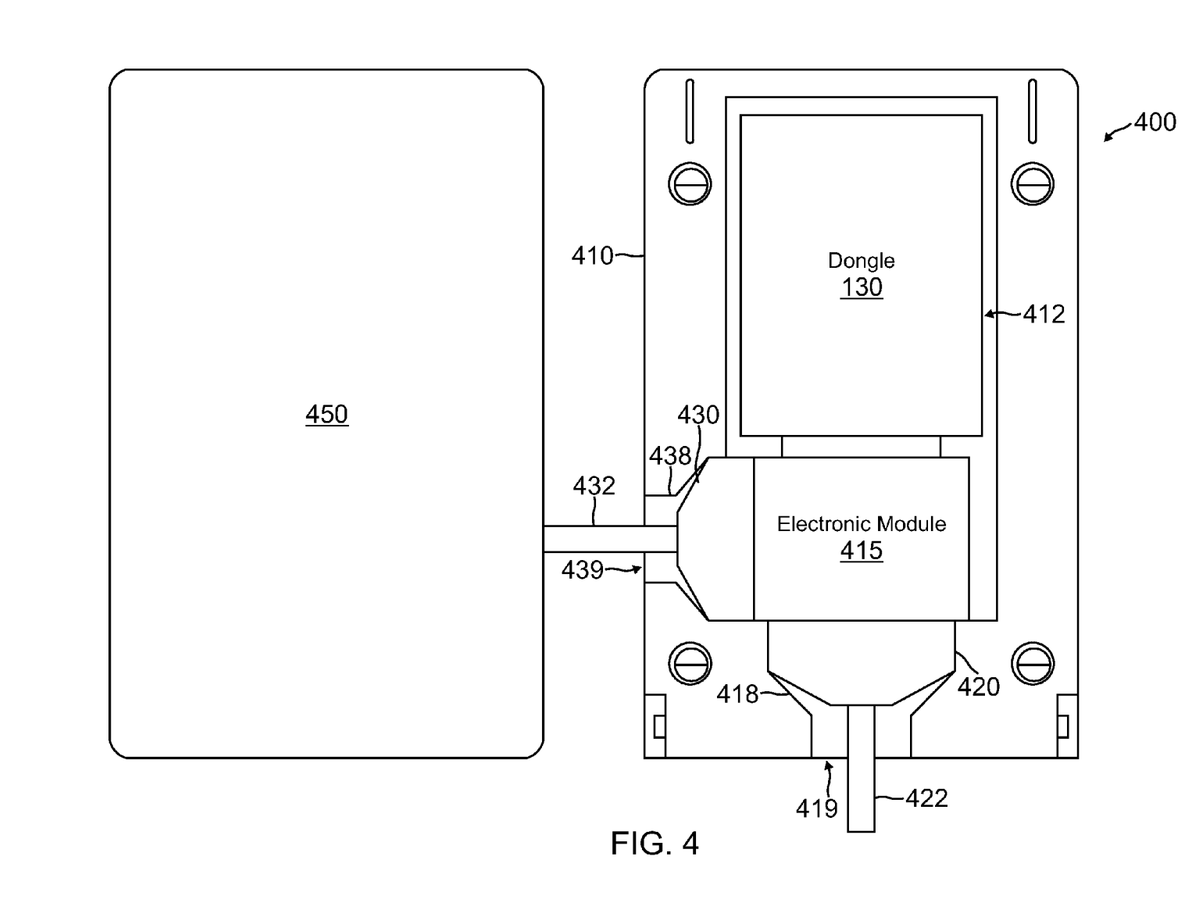
FIG. 4 is a diagram illustrating an electronics mounting adapter of an embodiment of the present invention.

FIG. 4 illustrates yet another embodiment where an electronic module 415 performs a routing function, permitting electronics mounting adapter 400 to be linked to a companion electronics mounting adapter (shown at 450) to share power and communication over cable 422. In this embodiment, electronics mounting adapter 400 comprises a base member 410 that supports communication with the companion electronics mounting adapter 450 via a secondary cable 432. For example, in one implementation, electronics mounting adapter 450 houses a dongle and may comprise any of the described electronics mounting adapter embodiments above, or combinations thereof, either with or without an electronic module. The dongle within electronics mounting adapter 450 is coupled to the electronic module 415 of electronics mounting adapter 400 which will allow the appropriate dongle to be powered on and off and communicate based on commands over cable 422.

For the embodiment shown in FIG. 4 base 410 includes a first cable stabilizing element 418 such as described above with respect to base 110 and cable stabilizing element 118. In the particular embodiment shown in FIG. 4, cable stabilizing element 418 comprises a friction fit clamp formed from a wedge shaped featured defined by the walls of cavity 412 in the proximity of an opening 419 where cable 422 with connector 420 enters base member 410. Base 410 further includes a second first cable stabilizing element 438, which in FIG. 4 comprises a friction fit clamp formed from a wedge shaped featured defined by the walls of cavity 412 in the proximity of an opening 439 where cable 432 with connector 430 enters base member 410. Electronic module 415 essentially performs the same function as described with respect to electronics module 210 in FIG. 3, except via a different form factor. That is, rather than having a second dongle in the same cavity 412 as dongle 130, here the second dongle is housed in the companion electronics mounting adapter 450 and coupled to electronic module 415 via the secondary cable 432. Electronic module 415 routes communications between the two dongles and cable 422 as appropriate. Further, in alternate embodiments, electronic module 415 may perform any of the additional functions such as converting from one protocol or databus form to another (e.g. Ethernet to USB).

Figure 5A:
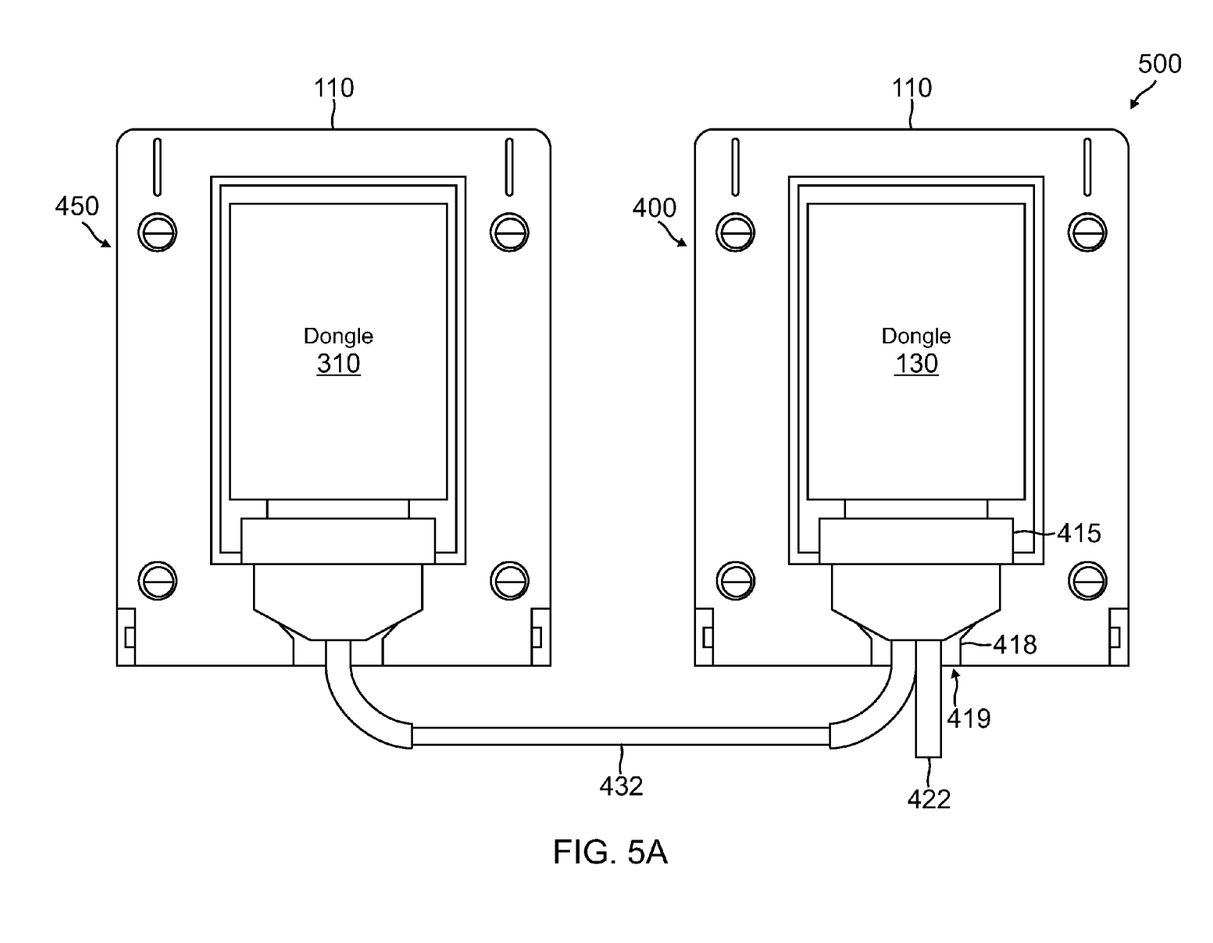
FIG. 5A is a diagram illustrating electronics mounting adapters of an embodiment of the present invention.
Figure 5B:
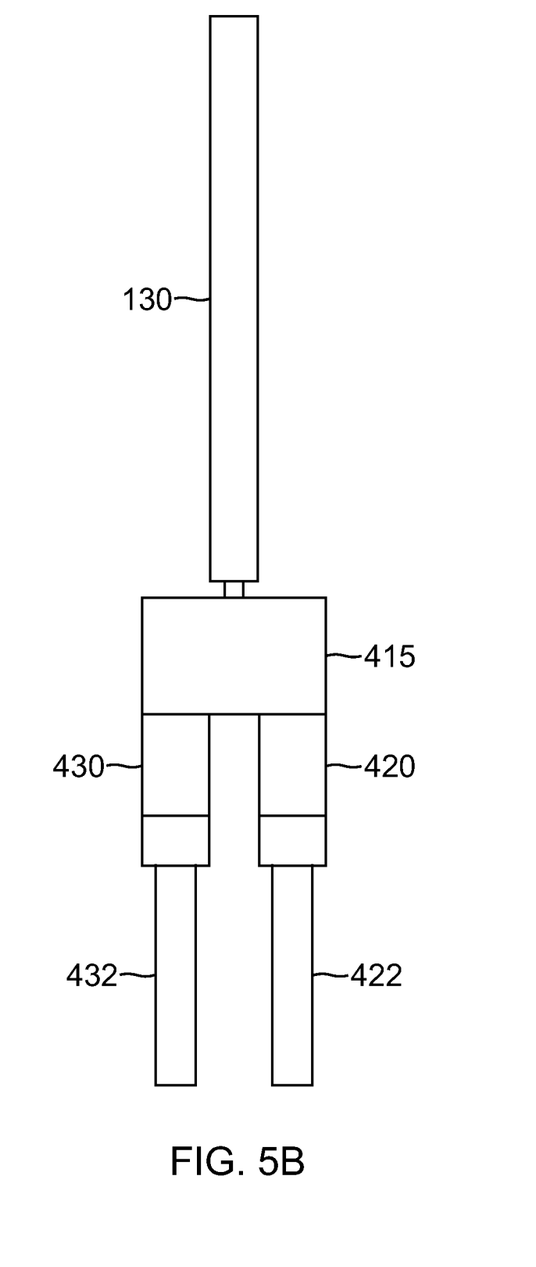
FIG. 5B is a diagram illustrating an electronics module of one embodiment of the present invention.

FIGS. 5A and 5B illustrate an example of one alternate configuration generally at 500. In this configuration, both electronics mounting adapter 400 and electronics mounting adapter 450 comprise a base member such as described for base member 110. Cables 422 and 432 both enter opening 419 and are coupled to electronic module 415 as shown in FIG. 5B. In such an embodiment, both cable connectors 420 and 430 are secured with cable stabilizing element 418.

With any these embodiments, installation, removal and replacement of a dongle, such as dongle 130, can be easily achieved without the need for special tools. For example, in one embodiment to install dongle 130, cable 136 is routed through opening 119 and cable connector 135 positioned to be accessible within cavity 112. If conforming material 116 will be used as an element for clamping the motion of dongle 130 within cavity 112, then proper installation of conforming material 116 onto base 110 within cavity 112 is verified. The dongle 130 is then coupled directly to cable connector 135, or alternately coupled to cable connector 135 via an electronic module (such as 210 or 415). Cable connector 135 is then positioned into cable stabilizing element 118 and pressed into place. If the dongle 135 connects to an external antenna, the wire for the antenna can be routed in cavity 112 from the dongle antenna thru a hole in the side of the base 110 to connect to the external antenna. When conforming material 123 will be used as an element for clamping the motion of dongle 130 within cavity 112, then proper installation of conforming material 123 onto cover 120 is verified. Cover 120 is then rotated into the closed position and snapped closed onto base member 110 using snap fasteners 128. Where an alternate to conforming material 116, 123 is used for clamping dongle (such as hand operated fasteners 180 for example) then those means may be implemented before closing cover 120.

Figure 6:
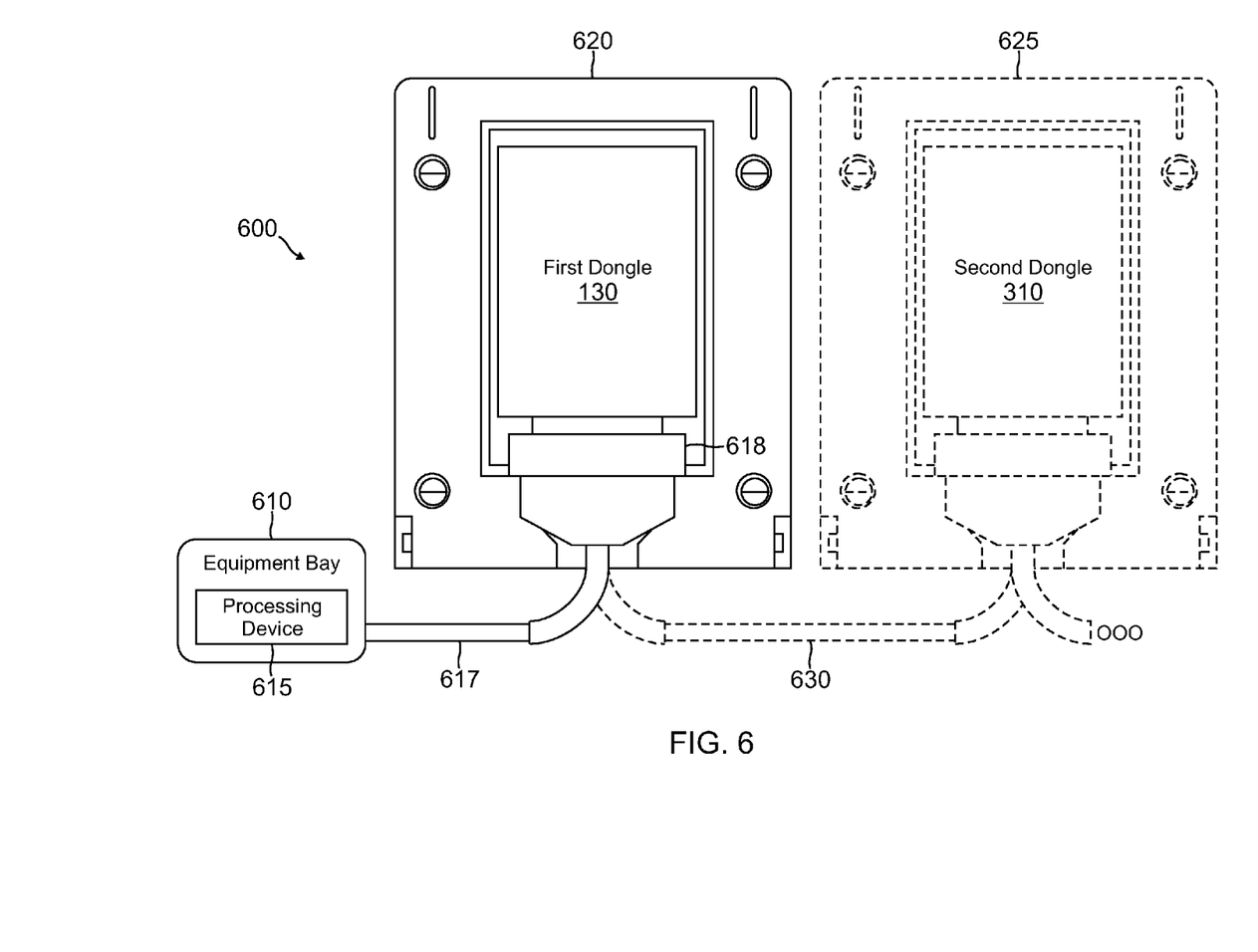
FIG. 6 is a diagram illustrating a wireless communication system using electronics mounting adapters of embodiments of the present invention.

FIG. 6 is a diagram illustrating an example of a system embodiment of the present invention. System 600 provides a wireless communications system used on-board a vehicle such as an aircraft. System comprises an equipment bay 610 on-board the vehicle and comprising at least one processing device 615. Processing device 615 may include, but is not limited to, an on-board computing system or communication management system. A multiple number of dongles may be connected to processing device 615 using one or more of the above discussed embodiments. For example, in one embodiment, a first dongle 130 comprising a wireless communication transceiver is coupled to the processing device 615 by a first cable 617. System 600 further comprises an electronics mounting adapter 620 which may include any combination of the implementations described above with respect to electronics mounting adapters 100 or 400. For example, in one embodiment, electronics mounting adapter 620 has a base member such as base member 110 that includes a cavity and at least one cable stabilizing element configured to secure a first cable connector of the first cable 617 within the cavity, wherein the first cable 617 is routed though an opening in the base member into the cavity. A cover is coupled to the base member by at least one fastener as described above. Electronics mounting adapter 620 includes one or more mounting provisions for securing the base member to a mounting surface on the vehicle, and at least one clamping element configured to clamp the first dongle 130 within the cavity with the first dongle 130 is coupled to the cable connector. Cable 617 may be any form of cable such as a USB or Ethernet cable for example. For some implementations, multiple dongles can be directly coupled to processing device 615 in this manner through their own cables.

For other implementations, system 600 may further comprise one or more additional dongles each coupled to processing device 615 via cable 617, such as the second dongle 310 shown in FIG. 6. The second dongle 310 may be another wireless communication transceiver or may perform another function. In the embodiment shown in FIG. 6, the second dongle 310 is secured within a companion electronics mounting adapter 625, which may also include any combination of the implementations described above with respect to electronics mounting adapters 100 or 400. In such an embodiment, the second dongle 310 is coupled to an electronic module 618 within electronics mounting adapter 620 by a secondary cable 630. Alternately, both the first dongle 130 and second dongle 310 could be secured within adapter 625 in the same manner as discussed above for FIG. 3. Either way, both the first dongle 130 and the second dongle 310 are coupled to the first cable 617 via the electronic module 618, which functions as a router, or hub. In some embodiment, electronic module 618 may alternately, or additionally, function as described above with respect to electronic modules 210 or 415 as a connector converter to facilitate electrical connections from dongle 130 (and/or dongle 310) to cable 617 where different mechanical plug interfaces are used.

Electronic module 618 may alternately, or additionally, function as a network protocol converter such as where cable 617 uses Ethernet protocol and dongle 130 (and/or dongle 310) is a USB device. Further companion electronics mounting adapter 625 may itself include such an electronic module for connecting additional dongles in additional companion electronics mounting adapters.

Although the embodiments described above have been presented primarily for use in avionics applications, any of the embodiments described above in any combination may also be used in non-avionics applications (such as on boats, ships, spacecraft, trains, trucks, busses, recreational vehicles, off-road vehicles) where it is desired to utilize plug-in style dongles in an environment subject to vibration. Material used to fabricate elements of an electronics mounting adapter would be appropriate for the particular application. For example, for avionics applications, elements may be fabricated from material that does not produce toxic smoke when under combustion.

EXAMPLE EMBODIMENTS

Example 1 includes an electronics mounting adapter device, the device comprising: a base member that includes a cavity and at least one cable stabilizing element configured to secure a cable connector of a cable within the cavity, wherein the cable is routed though an opening in the base member into the cavity; a cover coupled to the base member by at least one fastener; one or more mounting provisions for securing the base member to a mounting surface; and at least one clamping element configured to clamp a dongle within the cavity, wherein the dongle is coupled to the cable connector.

Example 2 includes the device of example 1, wherein the at least one cable stabilizing element comprises a friction fit clamp formed from a wedge shaped featured defined by walls of the cavity in proximity to the opening where the cable enters the base member.

Example 3 includes the device of example 2, wherein the cable connector is a standard sized Type-A USB connector and the cable stabilizing element sized in width to snugly accommodate the cable connector.

Example 4 includes the device of any of examples 2-3, wherein the wedge shape of the cable stabilizing element narrows around the cable so that the cable fits through the opening but the cable connector will not.

Example 5 includes the device of any of examples 2-4, wherein the cover is coupled to the base member by at least one hinge fastener.

Example 6 includes the device of any of examples 1-5, wherein the at least one clamping element comprises at least one strip of conforming material.

Example 7 includes the device of example 6, wherein the strip of conforming material is affixed to the base member within the cavity.

Example 8 includes the device of any of examples 6-7, wherein the strip of conforming material is affixed to the an interior surface of the cover that faces into the cavity when the cover is closed.

Example 9 includes the device of any of examples 1-8, wherein the at least one clamping element comprises one or more hand operated fasteners that penetrate the base member into the cavity and apply a clamping force on the dongle.

Example 10 includes the device of any of examples 1-9 with the base member further comprising an electronic module that couples the dongle to the cable connector.

Example 11 includes the device of example 10, wherein the electronic module functions as one or more of, a network protocol converter, a physical port connection converter, and a multi-port hub.

Example 12 includes the device of any of examples 1-11 wherein an exterior surface of the cover comprises removable decorative panels.

Example 13 includes a wireless communications system for a vehicle, the system comprising: an equipment bay on-board the vehicle and comprising at least one processing device; a first dongle comprising a wireless communication transceiver, the first dongle coupled to the at least one processing device by a first cable; an electronics mounting adapter comprising: a base member that includes a cavity and at least one cable stabilizing element configured to secure a first cable connector of the first cable within the cavity, wherein the first cable is routed though an opening in the base member into the cavity; a cover coupled to the base member by at least one fastener; one or more mounting provisions for securing the base member to a mounting surface on the vehicle; and at least one clamping element configured to clamp the dongle within the cavity, wherein the first dongle is coupled to the cable connector.

Example 14 includes the system of example 13 wherein the cable is one of either a USB cable, and ARINC 429 cable, a fiber optic cable, or an Ethernet cable.

Example 15 includes the system of any of examples 13-14, wherein the at least one cable stabilizing element comprises a friction fit clamp formed from a wedge shaped featured defined by walls of the cavity in proximity to the opening where the cable enters the base member; wherein the wedge shape of the cable stabilizing element narrows around the cable so that the cable fits through the opening but the cable connector will not.

Example 16 includes the system of any of examples 13-15, wherein an exterior surface of the cover comprises removable decorative panels.

Example 17 includes the system of any of examples 13-16, wherein the at least one clamping element comprises at least one strip of conforming material affixed to one or both of the base member within the cavity or an interior surface of the cover that faces into the cavity when the cover is closed.

Example 18 includes the system of any of examples 13-16, with the base member further comprising an electronic module that couples the first dongle to the cable connector.

Example 19 includes the system of example 18, further comprising a second dongle comprising a wireless communication transceiver, wherein the second dongle is couple to the first cable via the electronic module.

Example 20 includes the system of any of examples 13-19, further comprising a companion electronics mounting adapter, wherein the second dongle is secured within the companion electronics mounting adapter; and wherein the second dongle is coupled to the first cable via the electronic module within the base member of the electronics mounting adapter.

Example 21 includes any of examples 1-20, wherein the dongle provides wireless communications such as any form of radio communications, or other wireless communications forms such as, but not limited to, infrared, ultraviolet, magnetic, inductive, and audio.

Example 22 includes any of examples 1-21, wherein any of said cables may be a USB cable, an Ethernet cable, an ARINC 429 cable, a fiber optic cable, or any other cable type.

Further, although specific embodiments have been illustrated and described herein, it will be appreciated by those of ordinary skill in the art that any arrangement, which is calculated to achieve the same purpose, may be substituted for the specific embodiments shown. Further, any of the described embodiments and implementations discussed herein may be combined to produce yet additional embodiments. This application is intended to cover any adaptations or variations of the present invention. Therefore, it is manifestly intended that this invention be limited only by the claims and the equivalents thereof.

What is claimed is:

1. An electronics mounting adapter device, the device comprising:
   a base member that includes a cavity and at least one cable stabilizing element configured to secure a cable connector of a cable within the cavity, wherein the cable is routed through an opening in the base member into the cavity;
   a cover coupled to the base member by at least one fastener;
   one or more mounting provisions for securing the base member to a mounting surface; and
   at least one clamping element configured to clamp a dongle within the cavity, wherein the dongle is coupled to the cable connector, wherein the dongle comprises a self-contained plug-in style peripheral device; and
   wherein the at least one clamping element comprises one or more hand operated fasteners that penetrate the base member into the cavity and apply a clamping force on the dongle.

2. The device of claim 1, wherein the at least one cable stabilizing element comprises a friction fit clamp formed from a wedge shaped featured defined by walls of the cavity in proximity to the opening where the cable enters the base member.

3. The device of claim 2, wherein the cable connector is a standard sized Type-A USB connector and the cable stabilizing element sized in width to snugly accommodate the cable connector.

4. The device of claim 2, wherein the wedge shape of the cable stabilizing element narrows around the cable so that the cable fits through the opening but the cable connector will not.

5. The device of claim 2, wherein the cover is coupled to the base member by at least one hinge fastener.

6. The device of claim 1, wherein the at least one clamping element comprises at least one strip of conforming material.

7. The device of claim 6, wherein the strip of conforming material is affixed to the base member within the cavity.

8. The device of claim 6, wherein the strip of conforming material is affixed to an interior surface of the cover that faces into the cavity when the cover is closed.

9. The device of claim 1, the base member further comprising an electronic module that couples the dongle to the cable connector.

10. The device of claim 9, wherein the electronic module functions as one or more of, a network protocol converter, a physical port connection converter, and a multi-port hub.

11. The device of claim 1, wherein an exterior surface of the cover comprises removable decorative panels.

12. A wireless communications system for a vehicle, the system comprising:
   an equipment bay on-board the vehicle and comprising at least one processing device;
   a first dongle comprising a wireless communication transceiver, the first dongle coupled to the at least one processing device by a first cable;
   an electronics mounting adapter comprising:
   a base member that includes a cavity and at least one cable stabilizing element configured to secure a first cable connector of the first cable within the cavity, wherein the first cable is routed though an opening in the base member into the cavity;
   a cover coupled to the base member by at least one fastener;
   one or more mounting provisions for securing the base member to a mounting surface on the vehicle; and
   at least one clamping element configured to clamp the dongle within the cavity, wherein the first dongle is coupled to the cable connector
   wherein the at least one clamping element comprises one or more hand operated fasteners that penetrate the base member into the cavity and apply a clamping force on the dongle.

13. The system of claim 12, wherein the first cable is one of either a USB cable, an ARINC 429 cable, a fiber optic cable, or an Ethernet cable.

14. The system of claim 12, wherein the at least one cable stabilizing element comprises a friction fit clamp formed from a wedge shaped featured defined by walls of the cavity in proximity to the opening where the cable enters the base member;
   wherein the wedge shape of the cable stabilizing element narrows around the cable so that the cable fits through the opening but the cable connector will not.

15. The system of claim 12, wherein an exterior surface of the cover comprises removable decorative panels.

16. The system of claim 12, wherein the at least one clamping element comprises at least one strip of conforming material affixed to one or both of the base member within the cavity or an interior surface of the cover that faces into the cavity when the cover is closed.

17. The system of claim 12, the base member further comprising an electronic module that couples the first dongle to the cable connector.

18. The system of claim 17 further comprising a second dongle comprising a wireless communication transceiver, wherein the second dongle is couple to the first cable via the electronic module.

19. The system of claim 17, further comprising a companion electronics mounting adapter external to the electronics mounting adapter, wherein the second dongle is secured within the companion electronics mounting adapter; and
   wherein the second dongle is coupled to the first cable via the electronic module within the base member of the electronics mounting adapter.

* * * * *